United States Patent [19]

Takita

[11] Patent Number: 4,954,907
[45] Date of Patent: Sep. 4, 1990

[54] HEAD POSITIONING CONTROL METHOD AND SYSTEM

[75] Inventor: Kazuyuki Takita, Hachiohji, Japan

[73] Assignee: International Business Machines Corporation, Armonk, N.Y.

[21] Appl. No.: 227,588

[22] Filed: Aug. 2, 1988

[30] Foreign Application Priority Data

Aug. 6, 1987 [JP] Japan ................................ 62-195436

[51] Int. Cl.$^5$ ............................................ G11B 5/55
[52] U.S. Cl. ................................. 360/78.07; 360/78.04
[58] Field of Search ............... 360/78.04, 78.07, 78.12, 360/78.14, 77.04

[56] References Cited

U.S. PATENT DOCUMENTS

| 4,068,269 | 1/1978 | Commander et al. | 360/78.14 |
| 4,679,103 | 7/1987 | Workman | 360/78.14 |
| 4,775,903 | 10/1988 | Knowles | 360/77.04 |

FOREIGN PATENT DOCUMENTS

| 59119577 | 7/1984 | Japan . |
| 59146485 | 8/1984 | Japan . |
| 59146486 | 8/1984 | Japan . |

OTHER PUBLICATIONS

J. P. Mantey, "Offset Force Correction for Disk File", IBM TDB, vol. 21, No. 5, Oct. 1978, pp. 1792-1795.
R. K. Oswald, "Design of a Disk File Head-Positioning Servo", IBM Journal of Res. & Dev., Nov. 1974, pp. 506-512.
C. Maury, "High Track Density for Magnetic Disk Drive with an 'Embedded Servo' Positioning System", IEEE Trans. on Magnetics, MAG-17, No. 4, Jul. 1981.

Primary Examiner—Vincent P. Canney
Assistant Examiner—David L. Robertson
Attorney, Agent, or Firm—Thomas R. Berthold

[57] ABSTRACT

A data recording disk file, wherein head positioning servo information is located in sectors angularly spaced around the disk, utilizes an improved head positioning control system for data track following. The control system includes timing circuitry and head position detection circuitry for generating, respectively, a servo sector initiation signal and a signal representative of the head position relative to the centerline of the desired data track to be followed. The control system also includes a velocity detector for determining the velocity of the head relative to the data tracks, a microprocessor for computing an actuator input current signal for moving the actuator and the attached head so as to maintain the head on the desired data track between servo, and memory storage means for storing predetermined constants and values of previously measured head velocity and previously computed actuator input current signals. In response to the servo sector intiation signal, the microprocessor computs a new actuator input current signal based upon the new measured head position, the new measured head velocity, the previously measured head velocity, the previously computed actuator input current signal, and predetermined stored constants, and outputs this new current signal to the actuator. The microprocessor computation takes advantage of the fact that the disturbance to the position of the head during track following and between servo sectors is directly related to the difference between the actual acceleration of the head and the previously set head acceleration.

5 Claims, 7 Drawing Sheets

| SAMPLING TIME | 1 | 2 | 3 | 4 |
|---|---|---|---|---|
| HEAD POSITION | 1 | 1.25 | 1 | 0 |
| HEAD VELOCITY | -1 | 1.5 | -2 | 0 |
| ACCELERATION CORRECTION | -1 | -1 | -1 | -1 |
| CURRENT TO BE APPLID TO DRIVING DEVICE | -1.5 | -4.5 | 1 | -1 |

HEAD POSITIONING CONTROL METHOD AND SYSTEM

BACKGROUND OF THE INVENTION

The present invention is related to the positioning control of the read-write head of a data recording disk unit. More particularly, the head positioning control of the present invention is a sector servo system, and is directed to the control system of the track following mode.

In a disk unit, accurate positioning of the head at a target track is an essential factor in providing the disk unit with a large capacity, and quick positioning of the head at the target track is also an essential factor in providing the disk unit with a high speed. In a high-density disk unit, in order to accomplish the foregoing, a voice coil motor is used as a driving device, positional information is previously written on the disk surface, the positional information is detected by the head and fed back, and the above driving device is driven by a closed-loop servo system to perform the positioning of the head. The head positioning operation is largely classified into two modes. One is the velocity control mode, and the other is the track following mode. In the velocity control mode, the velocity of the head is controlled to move the head to the neighborhood of a target track within the minimum time. After the head reaches the above-mentioned neighborhood of the track, control goes to the track following mode. In the track following mode, control is made so as to zero out the position error between the head and the target track, whereby the head is positioned at the target track with high precision, completing the head positioning operation. The description of these head positioning operations is given in R.K. Oswald, "Design of a Disk File Head-Positioning Servo", IBM Journal of Research and Development, November 1974, pp. 506-512.

As disk units are made small and provided with a large capacity, the sector servo system (or buried servo system) is attracting notice as a head positioning system suitable for small-sized and large-capacity disk units. This system has the following advantages as compared with the conventional servo surface servo system which uses a dedicated servo surface.

Since the servo positional information is placed in the sectors on the data surface instead of being recorded by occupying one surface of a disk medium such as the servo surface, the utility factor of the data area of the total disk surface in the disk file is high.

Since the servo positional information is placed on each surface of the disk, it may be possible to neglect the deviation of the head from the target track position (off-track) which is caused by the inclination of the spindle for rotating the disk medium due to heat or the like.

The layout of the servo positional information area and the data area on the surface of the disk medium in this system is shown in FIG. 5. As is apparent from FIG. 5, the positioning control of this sector servo system adopts sampled data control, as compared with the conventional servo surface servo system which is a continuous system control, because the servo positional information is in the sectors and its detection becomes discontinuous. One method of head positioning control of this sector servo system is introduced in "HIGH TRACK DENSITY FOR MAGNETIC DISK DRIVE WITH AN 'EMBEDDED SERVO' POSITIONING SYSTEM" by C. Maury, IEEE TRANSACTION ON MAGNETICS, VOL. MAG-17, NO. 4, JULY 1981, pp. 1396-1402.

As the speed and cost reduction of microprocessors have proceeded, it has become possible to make the processors perform various calculations to carry out estimative control. To perform estimative control, it is necessary to cause an arithmetic device called an estimator to process much of the servo data. One such method is disclosed in Japanese patent application No. 62-70561.

The track following mode in head positioning control is most important in allowing the head positioning to be performed with high precision and at a high speed. In performing the sampled servo data control, if it is assumed that the voice coil is driven with current, the driving current which is to flow after the present sampling and till the next sampling is denoted $I_n$, the head position (distance to the target track) detected at the present sampling is $X_n$, and the head velocity is $V_n$. The following relation is applied.

$$I_n = -AX_n - BV_n \tag{1}$$

It is known to drive the voice coil with a driving current given by the equation (1) only. The values of constants A and B are optimized on the basis of the maximum current value, sample period and mechanical rigidity characteristics, depending on each application. When it is desired to position the head at the target track within a short time in the track following mode and terminate the head positioning operation, if it is assumed, for instance, that the sample period is T, the constant for converting acceleration to current is M, and $A = M/T^2$ and $B = 3M/(2T)$, then the head is allowed to rest at the target track at the 3rd sampling. The movement of the head in this case is shown in FIG. 6. FIG. 6 represents normalization provided by assuming that the sampling interval is 1, the head position when entering the track following mode is 1, and the velocity of the head when entering the track following mode is $-1$.

The sampling and the head movement will be described referring to FIG. 4. The servo positional information is radially arranged from the center of the disk medium surface as shown. Since the disk medium is rotating at a fixed number of revolutions and the head is moved by the driving device toward the center of the disk medium, the locus of the head movement is as shown in the figure. In addition, since the disk medium is rotating at a fixed number of revolutions as mentioned above, the sampling interval becomes T which is constant. It is apparent that, if the number of sectors of one track is N and the number of disk revolutions is R per second, $T = 1/(N \times R)$.

The area placed at the beginning of each servo positional information and erased by a d.c. current for instance, is detected, and a sector mark is output. The sector mark triggers the sampling gate for sampling the position signal. The sampling gate is opened for a certain predetermined time, during which the servo positional information is taken in. At the same time, the velocity signal is also sampled, providing $X_n$ and $V_n$ of the above equation (1). An arithmetic operation is performed using these to vary a driving current, thereby positioning the head at the target track.

In following a track, the driving device is subjected to a kind of force which is substantially fixed or is of a very low frequency, this force causes an off-track of the driving device, hence of the attached head from the target track. These disturbances are generated by the circulating air flow due to the disk rotation, the force due to the bending of the flexible cable connecting the head and the circuitry portion, gravity, etc. Factors causing the off-track exist in addition to the aforementioned disturbances, and one of them is the input voltage offset of the power amplifier supplying the driving device with a current, for instance. The off-track due to these largely affects the precision of head positioning.

Taking the aforementioned example, consideration is provided for the case that a disturbance of an acceleration $\alpha$ is applied to the driving device. That is, it is assumed that the actual acceleration of the driving device is added with $\alpha$. Thus, $\alpha T^2 n$ always remains at the position term, and an off-track error is small while $\alpha$ is small, but as $\alpha$ becomes large, the off-track error naturally becomes large, affecting the performance of the disk device. That situation is shown in FIG. 7. FIG. 7, similarly to FIG. 6, represents the normalization provided by assuming that the sampling interval is 1, the head position when entering the track following mode is 1, and the head velocity when entering the track following mode is $-1$.

In order to reduce such off-track due to disturbances, several measures have so far been taken.

One method is to use an estimator as shown in the above Japanese patent application No. 62-7051 or "OFFSET FORCE CORRECTION FOR DISK FILE" by J. P. Mantey, IBM Technical Disclosure Bulletin, Vol. 21, No. 5, October 1978, pp. 1792-1795. In this case, the amount of arithmetic operation of the estimator is large, which makes it difficult to adopt the estimator in low-cost, small-sized disk units. Further, since the method as shown in Published Unexamined patent application No. 59-146486 needs a current detector for detecting the driving current of a servo motor and also needs several analog circuits such as differential circuits to differentiate the detected velocity of the servo motor, it makes the hardware construction and operation complicated, and it is not suitable for small-sized disk units intended to simplify the circuit construction and operation and to attain cost reduction by digitization.

SUMMARY OF THE INVENTION

The object of the present invention, in view of the above problems, is to provide a method and a system for controlling the head positioning of the track following mode optimum for small-sized disk units.

In the track following mode, a current value corresponding to an acceleration correction is added to the equation (1) to solve the above problems. That is, the difference between the head velocity at the previous sampling and the head velocity at the present sampling is proportional to the actual acceleration of the head by the head driving device. The difference between this acceleration and the set acceleration of the head according to the current value which was set so as to be applied to the head driving device after the previous sampling is considered due to disturbance. Accordingly, considering the difference between the above two accelerations as an acceleration correction, the problems can be solved by adding the current value corresponding to the acceleration correction to the equation (1).

The present invention is characterized by the fact that the above problems can be solved by adding a simple logic circuit and using arithmetic processing without adding an analog circuit.

DESCRIPTION OF THE PREFERRED EMBODIMENTS

Figure 1:
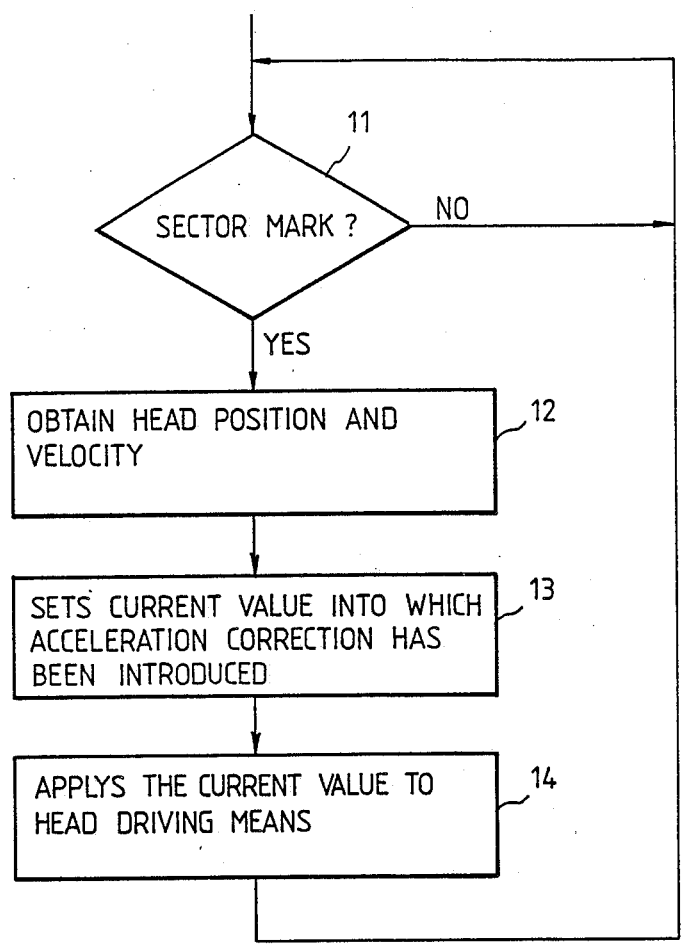
FIG. 1 is a flow chart for explaining the head positioning control method of the present invention.
Figure 2:
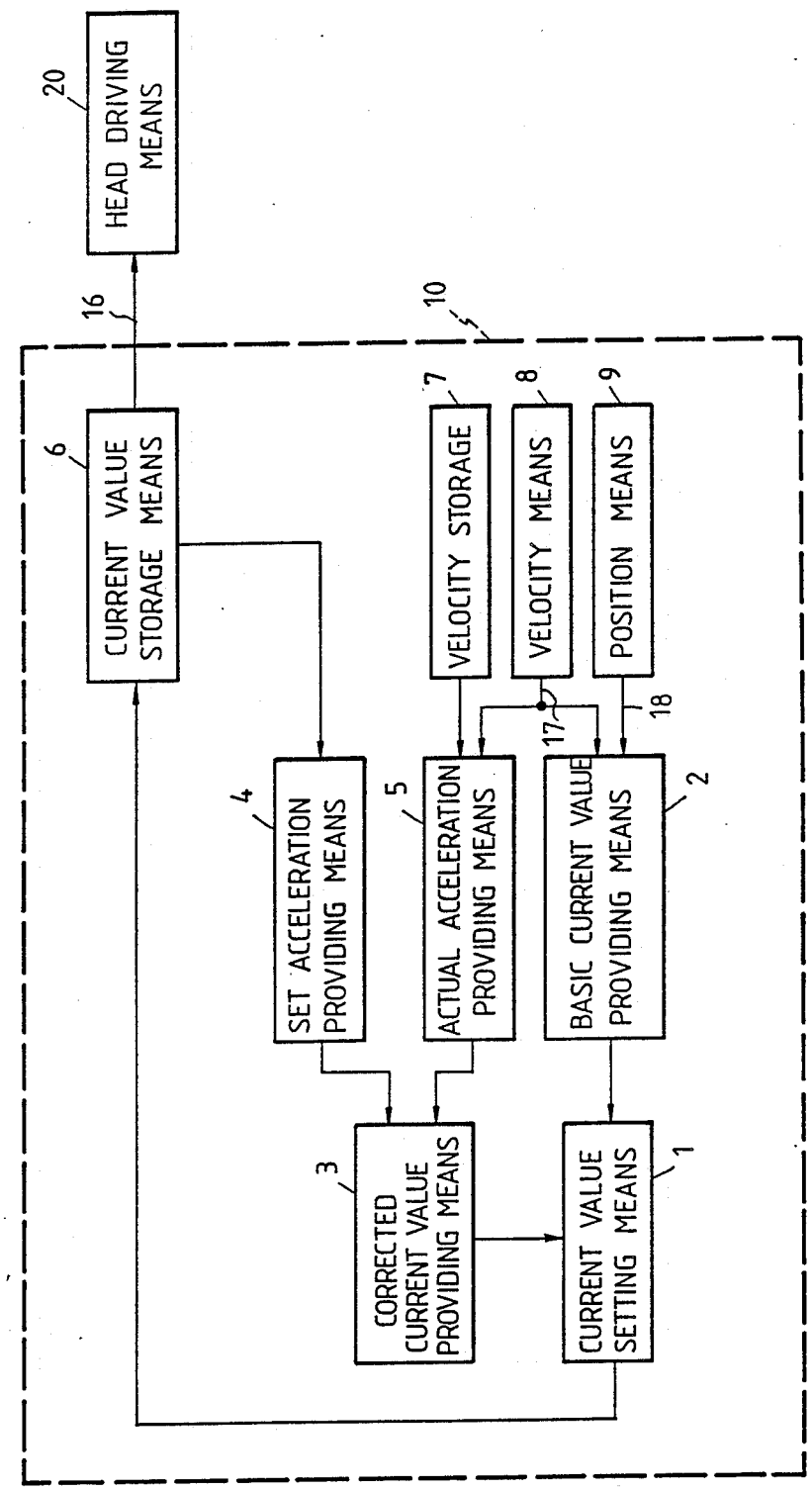
FIG. 2 is a block diagram for explaining the head positioning control system of the present invention.
Figure 3:
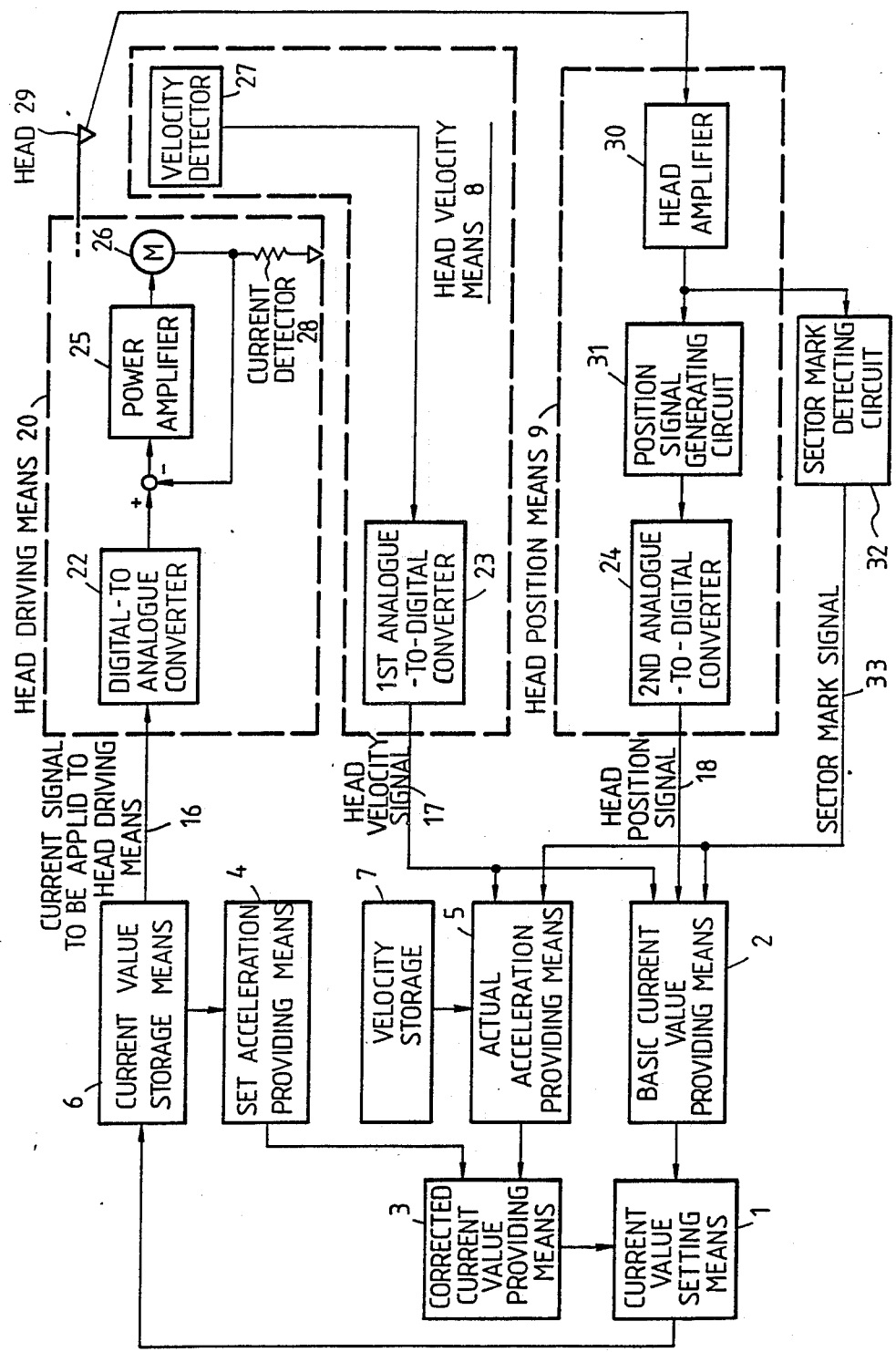
FIG. 3 is a block diagram for showing an embodiment of the present invention.
Figure 4:
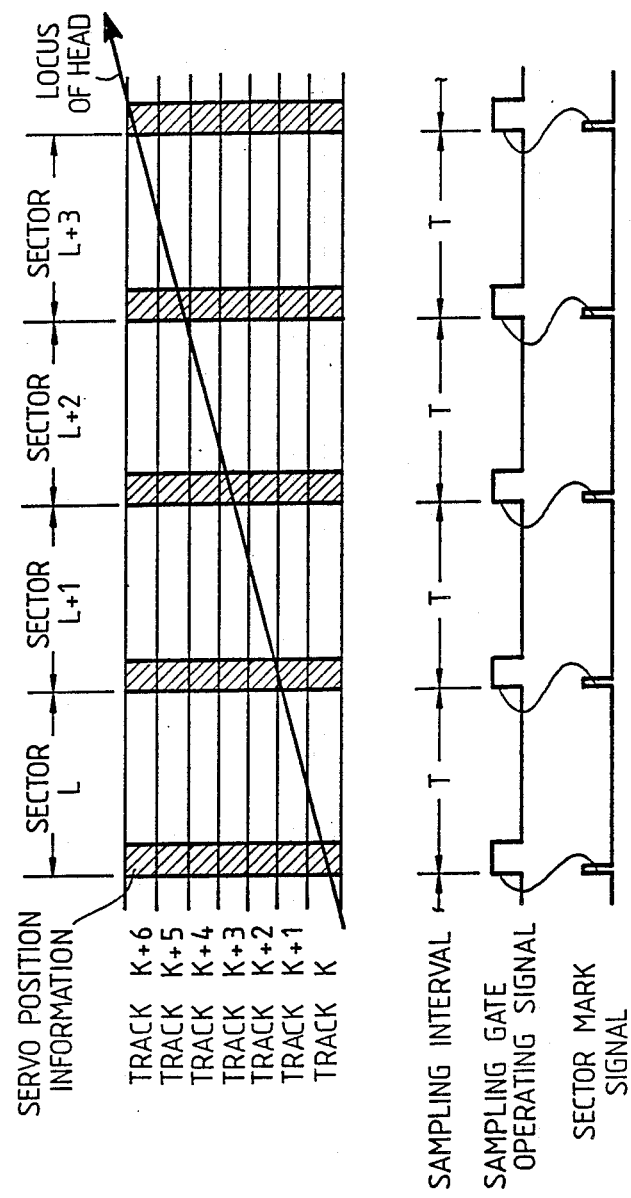
FIG. 4 is an explanatory representation showing the sampling and the locus of the head.
Figure 5:
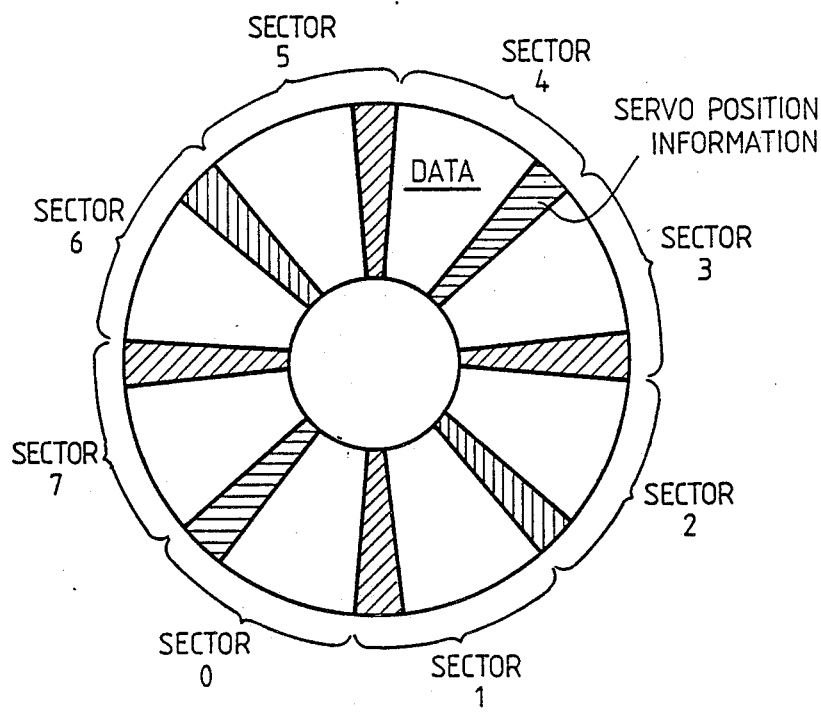
FIG. 5 is an explanatory representation showing a layout example of the servo positional information on a disk medium in the sector servo system.
Figure 6:
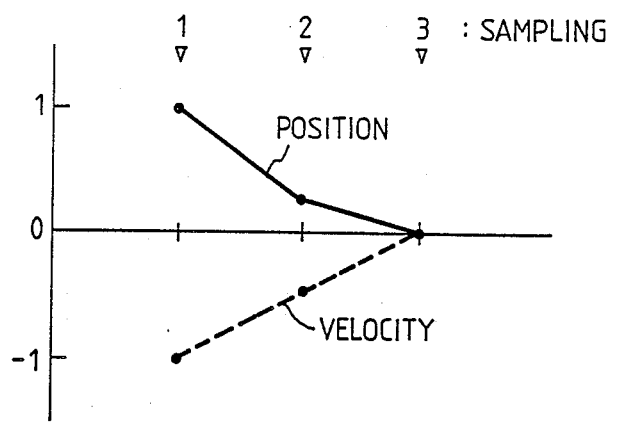
FIGS. 6 through 8 are diagrams showing change in the head position and velocity on various conditions.
Figure 7:
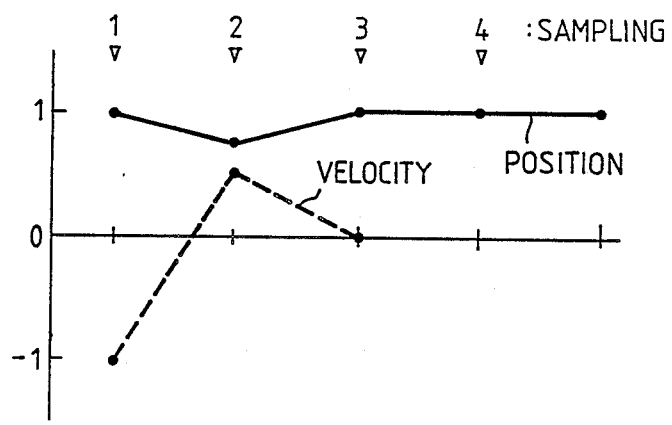

The method and system of the present invention will be described referring to a flow chart of FIG. 1 and a block diagram of FIG. 2.

In step 1, the inputting of a sector mark is awaited, and when the sector mark is input, the present sampling of the servo positional information is initiated.

In step 2, head position signal 18 is taken in from a position means 9 to obtain a head position at the present sampling. Also, in step 2, a head velocity signal 17 is taken in from a velocity means 8 to obtain a head velocity at the present sampling.

In step 3, the acceleration correction, which is defined by the difference between the set acceleration of the head after the previous sampling and the actual acceleration of the head after the previous sampling, is introduced into the initial current value of the equation (1). The initial current value is determined by the head velocity and position at the present sampling obtained in step 2, thereby setting the current value to be applied to the head driving means after the present sampling. The set acceleration of the head after the previous sampling is determined by the current value provided by a current value storage means 6 and set so as to be applied to a head driving means 20 after the previous sampling. The actual acceleration of the head after the previous sampling is determined by the difference between the head velocity at the previous sampling provided by a velocity storage means 7 and the head velocity at the present sampling provided by a velocity means 8. The set current value is stored in a current value storage means 6.

In step 4, the set current value is applied, as a current signal to be applied to the head driving means, to the head driving means 20. Thus, the current value to be applied after the present sampling is output from a head positioning control unit 10 of the present invention.

Steps 1 through 4 above are repeated, unless a velocity control mode is entered by inputting a next head moving instruction after a track following mode, thereby positioning the head at the target track.

The above current value $I_n$, which was set so as to be applied to the head driving means after the present sampling, can be expressed as:

$$I_n = -AX_n - BV_n + DI_{n-1} - C(V_n - V_{n-1}) \quad (2)$$
$$= -AX_n - (B + C)V_n + CV_{n-1} + DI_{n-1}$$
$$= -AX_n - EV_n + CV_{n-1} + DI_{n-1}, \quad (3)$$
where $(E = B + C)$ where $V_{n-1}$ is the head velocity at the previous sampling, and $I_{n-1}$ is the current value which was set so as to be applied to the head driving means after the previous sampling. The values of constants A, B, C and D are optimized by the maximum current value, sample period and mechanical rigidity characteristics, depending on each application.

Figure 8:
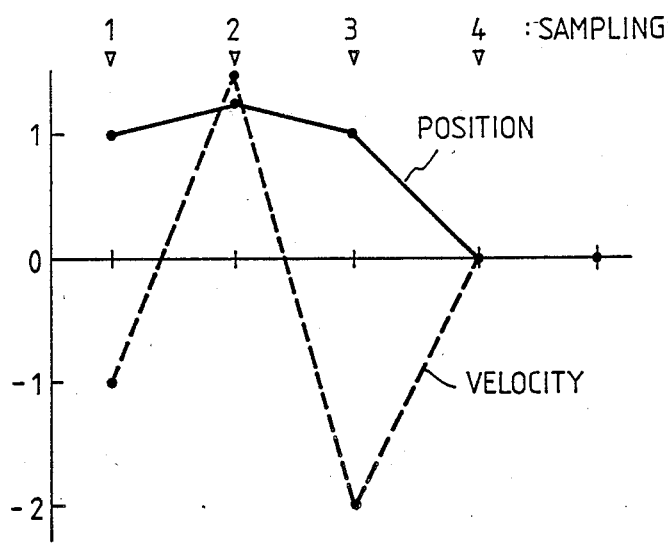

For instance, if $A=M/T^2$, $B=3M/2T$, $C=M/T$ and $D=1$, the head may be allowed to rest at the target track at the fourth sampling. This situation is shown in FIG. 8. FIG. 8 shows the normalization provided by assuming that the sampling interval is 1, the head position when entering the track following mode is 1, the head velocity when entering the track following mode is $-1$, and the disturbance acceleration is 1.

As may be seen from equation (3), it is better in view of arithmetic efficiency for the current value $I_n$ to be set by adding the product of the head position $X_n$ at the present sampling and a constant, the product of the head velocity $V_n$ at the present sampling and a constant, the product of the head velocity $V_{n-1}$ at the previous sampling and a constant, and the product of the current value $I_{n-1}$ which was set so as to be applied to the head driving means after the previous sampling and a constant. At that time, if the values of those constants are assumed to be $-M/T^2$ for $X_n$, $-5M/2T$ for $V_n$, $M/T$ for $V_{n-1}$, and 1 for $I_{n-1}$, respectively, the head may be allowed to rest at the target track at the fourth sampling.

Now, the system of the present invention will be described. As shown in FIG. 2, the velocity means 8 provides the head velocity signal 17, or the head velocity $V_n$ at the present sampling. Position means 9 provides the head position signal 18, or head position $X_n$ at the present sampling. The velocity $V_n$ and position $X_n$ of the head at the present sampling is provided to the basic current value providing means 2, and the basic current value providing means 2 provides a basic current value corresponding to the above equation (1), which is defined by $V_n$ and $X_n$.

On the other hand, the velocity storage means 7 is storing the head velocity $V_{n-1}$ at the previous sampling. The head velocity $V_{n-1}$ at the previous sampling is provided to the actual acceleration providing means 5 along with the head velocity $V_n$ at the present sampling, which provides the actual acceleration of the head determined by the difference between $V_n$ and $V_{n-1}$. Also, the current value storage means 6 provides to the set acceleration providing means 4 the current value $I_{n-1}$ stored therein and set so as to be applied to the head driving means 20 after the previous sampling, and the set acceleration providing means 4 provides a set acceleration of the head determined by $I_{n-1}$.

The set acceleration is provided along with the actual acceleration to a corrected current value providing means 3, which provides a corrected current value corresponding to the difference between the set acceleration and the actual acceleration. The corrected current value is provided along with the basic current value to a current value setting means 1, which sets a current value wherein the corrected value is introduced into the basic current value, and which provides the set current value to the current value memory means 6.

Now, an embodiment of the present invention is described referring to the drawings. For simplicity of explanation, description is provided by using an example in which the embodiment of the present invention is applied to a disk unit.

The control unit which is the embodiment of the present invention comprises the current value storage means 6 and the velocity storage means 7, which usually consist of a random access memory or a flip-flop register. Also, a microprocessor is employed for the current value setting means 1, the basic current value providing means 2, the corrected current value providing means 3, the set acceleration providing means 4 and the actual acceleration providing means 5. In some cases, the storage means 6 and 7 consist of one-chip microprocessors, which contain the memories along with their setting means and providing means.

The current value setting means 1 provides the set current value to the current value storage means 6, from which current signal 16 to be applied to the head driving means is output. To the basic current value providing means 2, head velocity signal 17 is input, and simultaneously head position signal 18 is input. Head velocity signal 17 is also input to the actual acceleration providing means 5. From the set acceleration providing means 4 and actual acceleration providing means 5, a set acceleration and an actual acceleration are input respectively to the corrected current value providing means 3. From the basic current value providing means 2 and corrected current value providing means 3, a basic current value and a corrected current value are input respectively to the current value setting means 1.

For a driving device 26, constituting head driving means 20, a d.c. motor, particularly, a voice coil motor or stepper motor is used. The output of a current detector 28 is fed back to the input of a power amplifier 25, constituting a constant-current drive control circuit. With this, the constant-current drive in accordance with the current signal 16 to be applied to the head driving means is provided to the driving device 26.

Usually, a tachometer is employed as a velocity detector 27, and an output proportional to the head velocity is digitized using first analog-to-digital converter 23 and output as the head velocity signal 17 to the basic current value providing means 2 and actual acceleration providing means 5. The velocity detector 27 and the first analog-to-digital converter 23 constitute the head velocity means 8.

A head 29 reads and writes data from and to a disk medium, and is used to read out the servo positional information. The servo positional information read out from the head 29 is amplified and shaped by a head amplifier 30, and sent to a position signal generating circuit 31. The position signal generating circuit 31 is a circuit which comprises a timing circuit, sample hold circuit, etc., consists of a circuit suitable for the servo positional information pattern to be read out, and converts the servo positional information to a position signal. The position signal is digitized in a second analog-to-digital converter 24 and sent to the basic current value providing means 2 as the head position signal 18. The head amplifier 30, the position signal generating circuit 31 and the second analog-to-digital converter 24 constitute the head position means 9.

In the velocity storage means 7, the head velocity which was read in at the previous sampling is stored.

The current value storage means 6 stores the current value to be applied to driving device 26, and the output of it is sent to a digital-to-analog converter 22 as the current signal 16 to be applied to the head driving means. The output of the digital-to-analog converter 22 is sent to the power amplifier 25 and converted to a current to drive the driving device 26.

A sector mark signal 33, indicating the beginning of the servo data is obtained by detecting the region erased by a d.c. current by means of a sector mark detecting circuit 32, said region usually being positioned at the beginning of the servo positional information.

Now, the flow of the arithmetic operation and the processing in this embodiment is described.

Step 1. The inputting of the sector mark is awaited, and the present sampling of the servo positional information is initiated upon the inputting of the sector mark.

Step 2. The head position signal 18 is taken into the basic current value providing means 2 from the head position means 9, and simultaneously the head velocity signal 17 is taken thereinto from the head velocity means 8.

Step 3. Further, the current value which was set so as to be applied to the head driving means after the previous sampling is taken into the set acceleration providing means 4 from the current value storage means 6, and simultaneously the head velocity at the previous sampling is taken thereinto from the velocity storage means 7, thereby setting the current value to be applied to the head driving means 20 after the present sampling, said current value including the basic current value, into which the corrected current value corresponding to the acceleration correction of the head has been introduced, as in the above described equation (2) or (3) for instance.

Step 4. This set current value is stored in the current value storage means 6, and is also output to the driving means 20 as the current signal 16 to be applied to the head driving means. This means that the current value to be applied after the present sampling has been outputted.

Step 5. To update the head velocity, the head velocity at the present sampling is stored in the velocity storage means 7.

Step 6. Return to the step 1.

The present invention enables correction of the off-track caused by disturbances or the like, to be made by addition of a simple logic circuit and arithmetic operation for adaptation to small-sized disk units.

What is claimed is:

1. A head positioning control system for use in a data recording disk file of the type wherein a head is connected to a current-driven head driving means and wherein servo information on the disk is sampled to provide head position information, the system comprising:
   a velocity means for measuring the velocity of a head;
   a position means for detecting the position of the head;
   a velocity storage means for storing the previous measured velocity of the head;
   a current value storage means for storing the current value to be applied to the head driving means;
   means for determining a basic current value from the measured velocity and the detected position at the present sampling;
   means for providing an actual acceleration of the head, said actual head acceleration providing means including means for determining the difference between the measured velocities of the head at the present and previous samplings;
   means coupled to the current value storage means for determining a set acceleration of the head from the current value stored in said current value storage means;
   means for providing a corrected current value, said corrected current value providing means including means for determining the difference between the actual acceleration and the set accelerations; and
   means coupled to the current value storage means for determining, from the basic current value and the corrected current value, a current value for the head current value storage means.

2. The system as claimed in claim 1 wherein said head driving means is a voice coil motor.

3. The system as claimed in claim 1 wherein said velocity means is a tachometer.

4. A data recording disk file of the type having at least one rotatable disk with generally concentric data tracks and sector servo information recorded thereon, a head for reading the servo information during rotation of the disk, and an actuator responsive to an input current signal and attached to the head for causing the head to follow a specific track, the disk file comprising:
   means coupled to the head for generating, for each sector of servo information read by the head, a servo sector initiation signal and a head position signal, $X_n$, wherein $X_n$ represents the head position signal from sector "n";
   a head velocity detector for generating, for each sector of servo information, a head velocity signal, $V_n$, wherein $V_n$ represents the head velocity signal from sector "n";
   a microprocessor coupled to the actuator for computing, for each sector of servo information, the value of an actuator input current signal, $I_n$, in response to the servo sector initiation signal, wherein $I_n$ represents the actuator input current signal computed for sector "n";
   means coupled to the computing means and the head velocity detector for storing the value of a previously generated head velocity signal, $V_{n-1}$;
   means coupled to the computing means and the head position signal generating means for storing the value of a previously computed actuator input current signal, $I_{n-1}$;
   means coupled to the computing means for storing the values of predetermined constants; and
   said computing means including means for computing $I_n$ according to the equation $$I_n = -AX_n - BV_n + DI_{n-1} - C(V_n - V_{n-1}),$$

wherein A, B, D and C are stored predetermined constants.

5. The disk file according to claim 4 wherein said microprocessor and all of said storing means are located on a single chip.

* * * * *

UNITED STATES PATENT AND TRADEMARK OFFICE
CERTIFICATE OF CORRECTION

PATENT NO. : 4,954,907

DATED : September 4, 1990

INVENTOR(S) : Kazuyuki Takita

It is certified that error appears in the above-identified patent and that said Letters Patent is hereby corrected as shown below:

Title page, in the Abstract, line 14, after "servo", insert --sectors--

Title page in the Abstract, line 19, delete "computs", insert --computes--

Column 1, line 37, delete "Servo",", change to --Servo,"--

Column 3, line 31, delete "patent application", insert --Patent Application--

Column 3, line 39, delete "patent application", insert --Patent Application--

In column 8, line 20, delete "head"

Signed and Sealed this

Twenty-eighth Day of January, 1992

Attest:

HARRY F. MANBECK, JR.

*Attesting Officer*  *Commissioner of Patents and Trademarks*